United States Patent [19]

Pomara, Jr.

[11] 3,915,316
[45] Oct. 28, 1975

[54] COUNTING AND STACKING APPARATUS
[75] Inventor: Johnny B. Pomara, Jr., Dallas, Tex.
[73] Assignee: El Chico Corporation, Dallas, Tex. ; a part interest
[22] Filed: July 28, 1972
[21] Appl. No.: 276,069

[52] U.S. Cl.................. 214/6 D; 198/35; 271/189
[51] Int. Cl.².......................................... B65G 57/14
[58] Field of Search................ 214/6 D, 6 DK, 6 H; 271/189, 217, 218, 219; 198/35; 93/93 DP

[56] References Cited
UNITED STATES PATENTS

| | | | |
|---|---|---|---|
| 2,424,093 | 7/1947 | Harred............................ | 214/6 D X |
| 2,805,757 | 9/1957 | Rapley................................ | 198/35 |
| 3,255,895 | 6/1966 | Klingler............................. | 214/6 H |
| 3,374,902 | 3/1968 | Mills................................... | 214/6 H |
| 3,392,853 | 7/1968 | Mitchell et al................... | 214/6 DK |
| 3,393,645 | 7/1968 | Mason............................ | 214/6 DK X |
| 3,525,443 | 8/1970 | Pomara............................ | 214/6 DK |
| 3,654,040 | 4/1972 | Watson............................ | 271/218 X |

FOREIGN PATENTS OR APPLICATIONS
1,002,247   2/1957   Germany.......................... 214/6 D Primary Examiner—Robert J. Spar
Assistant Examiner—Leslie J. Paperner
Attorney, Agent, or Firm—H. Mathews Garland

[57] ABSTRACT

Apparatus for counting and stacking substantially flat articles, such, particularly, as food articles of the nature of Mexican tortillas, which includes a first belt type feed conveyor, a second belt type stacking conveyor intermeshing with a vertically movable stacking rack or fork, and a take-away conveyor. The articles are sequentially fed from a conventional conveyor from apparatus such as an oven to the feed conveyor beneath a counting switch. Each article is discharged from the feed conveyor in a stacked relationship to the stacking conveyor against the stacking rack. When the desired number of articles are stacked on the stacking conveyor against the rack, the rack rapidly retracts downwardly releasing the stack for discharge to the take-away conveyor. Between the time of discharge of each stack and the arrival of the first article for forming the next stack, the stacking rack returns upwardly to intermeshed relationship with the stacking conveyor for forming and holding the next stack.

6 Claims, 5 Drawing Figures

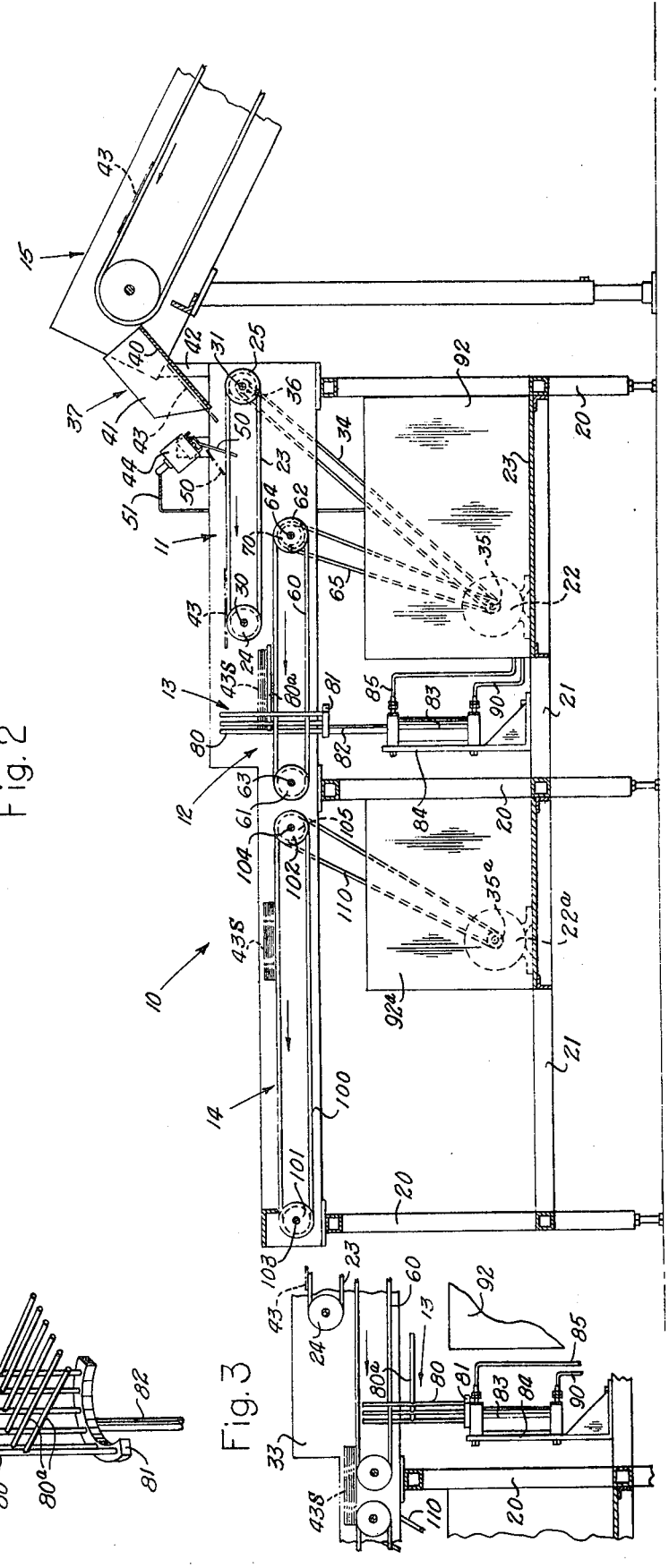
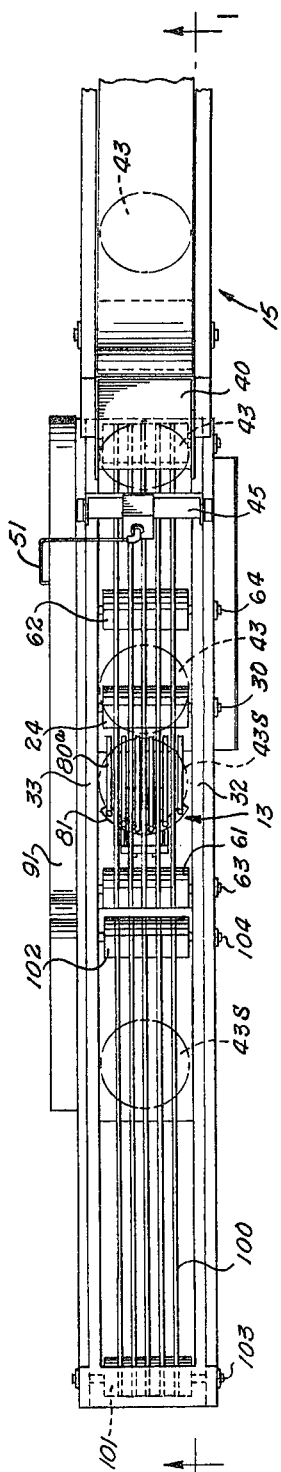
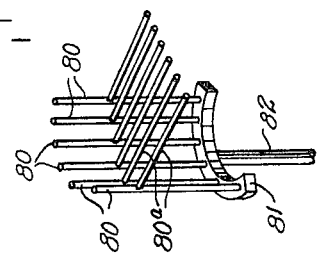

COUNTING AND STACKING APPARATUS

This invention relates to a counting and stacking apparatus and particularly relates to an apparatus for counting and stacking substantially flat articles.

In the packaging art, it is frequently necessary to count, stack, and package flat articles. This is particularly true in the food industry where food products such as waffles, meat patties, cookies, and a multitude of other items, including particularly the Mexican food product tortillas, are packaged for sale either frozen, fresh, or canned. The tortilla is an especially difficult article to handle in view of its thin, light, and often flexible nature. A number of counting and stacking systems have been proposed for handling thin flat articles and particularly for processing tortillas. One such system includes a feed conveyor which deposits the articles into a stacking guide on one or a pair of stack support plates removably positioned beneath the guide. The articles are either deposited directly on the stack support plates or on a stacking and alignment plate above the stack support plates. When the desired number of articles are stacked within the guide, the support plate or plates rapidly retract dropping the stack to a take-away conveyor. Another similar system employs a slide from which the articles are propelled into a stacking guide on a stacking plate. A still further system utilizes a series of conveyor rollers which deposit the articles sequentially on a top pair of sissor-like plates which separate as each article is deposited to drop the article downwardly to a second lower pair of scissor-like plates which separate when the desired number of articles are in a stack on the plate dropping the stack downwardly to a take-away conveyor. The various forms of available stacking apparatus which include both stacking plates and stack support and discharge plates have a number of inherent problems. The movements of each of the plates used must be very accurately timed to insure operation which both counts and properly stacks and discharges the articles. The use of these various types of plates substantially complicates the apparatus increasing the cost and requiring space both for the plates and for the plate operating systems for supporting and moving the plates. Not only is the initial expense of such stacking units high, but also, it will be evident that the maintenance of such systems is increased in proportion to the added amount of machinery included. Thus, a preferred form of stacking system is one such as the present invention which eliminates the need for the various stack forming and support plates and the related operating and counting systems necessary for the functioning of such plates.

It is therefore a particularly important object of the invention to provide a new and improved system for the counting and stacking of articles, particularly substantially flat food products.

It is another object of the invention to provide a new and improved counting and stacking apparatus which requires a minimum amount of space and is manufactured and maintained at minimum cost.

It is another object of the invention to provide a new and improved counting and stacking system which requires only a series of conveyor belts and a stacking frame or rack.

It is another object of the invention to provide a new and improved counting and stacking system which reliably operates to quickly count and stack substantially flat articles in stacks varied in number, as desired.

It is another object of the invention to provide a new and improved counting and stacking apparatus which is more easily and quickly maintained clean and sanitary than presently available systems of a similar type.

In accordance with the invention, there is provided a counting and stacking system especially adapted to packaging food products such as Mexican tortillas which includes a first feed conveyor adapted to receive in rapid sequence the articles to be counted and stacked from a supply conveyor which may be a discharge or cooling conveyor from a cooking oven or a cooling unit. A stacking conveyor is supported at the discharge end of the feed conveyor and is formed of a plurality of laterally spaced belts running over end rollers. A vertical stacking fork or rack is supported for movement between an upper intermeshed stacking relation with the belts on the stacking conveyor and a lower release position at which the rack is out of the line of movement of the top portions of the stacking conveyor belts. A counting switch is supported for contact with each of the articles as they move to the feed conveyor for operation of the stacking rack when a predetermined number of articles are deposited on the stacking conveyor against the rack. Each time the desired number of articles is stacked against the rack, the rack rapidly retracts downwardly releasing the stack of articles for movement to a take-away conveyor. The rack then rapidly returns upwardly in time to catch the next article deposited from the feed conveyor for assembling next stack. The take-away conveyor moves each stack to a packaging station.

The foregoing objects and advantages of invention will be apparent from reading the following detailed description taken in conjunction with the accompanying drawings wherein:

FIG. 1 is a side view in elevation of a counting and stacking apparatus embodying the invention;

FIG. 2 is a top plan view of the apparatus of FIG. 1;

FIG. 3 is a fragmentary perspective view of the stacking rack used in the apparatus of FIGS. 1 and 2;

FIG. 4 is a fragmentary side view in elevation showing the stacking rack moved downwardly to the lower stack discharge position.

Figure 5:
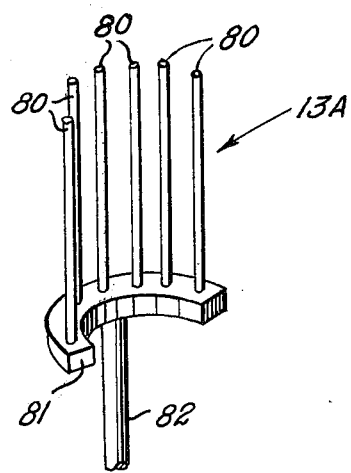
FIG. 5 is a fragmentary perspective view of an alternate form of stacking rack usable in the apparatus of FIGS. 1 and 2.

Referring to the drawings, a counting and stacking unit 10 embodying the invention includes a feed conveyor 11, a stacking conveyor 12, a stacking rack or fork 13, and a take-away conveyor 14. The counting and stacking unit is located at the discharge end of a conveyor 15 which may be a cooling conveyor or the discharge end of a conveyor from an oven employed in cooking the particular product to be counted and stacked by the apparatus. The several conveyors of the unit 10 are supported on a frame having a plurality of vertical legs 20 interconnected by horizontal braces 21. The conveyors are driven by a motor 22 mounted on a platform 23 supported on the braces 21.

The feed conveyor 11 comprises five laterally spaced parallel conveyor belts 23 which run on longitudinally spaced end rollers 24 and 25. The belts are preferably round in cross section and formed of a rubber of plastic material which is easily maintained sanitary and which is somewhat elastic but not so deformable that the belts cannot be readily maintained taut. The end rollers are grooved to depths substantially equal to the diameter of the conveyor belts at locations along the length of the rollers to properly space and maintain the positions of the belts as evident in FIG. 2 so that the belts will run in parallel spaced relationship. The rollers 24 and 25 are mounted on shafts 30 and 31, respectively, which extend between side panel assemblies 32 and 33 of the unit supporting frame. The conveyor 11 is driven by a belt 34 extending between a pulley 35 on the shaft of the motor 22 and a pulley 36 on the shaft 31 of the conveyor. The pulley sizes are proportioned to provide the desired running speed for the conveyor 11. A slide 37 having a base plate 40 and sides 41 is mounted on vertical brackets 42 from the side panel assemblies 32 and 33. The slide is located between the discharge end of the conveyor 15 and the feed conveyor 11 to deposit each of the articles 43 from the conveyor 15 to the feed conveyor. The slide is positioned at a proper angle to receive each of the articles 43 from the discharge end of the conveyor 15 and deposit the article on the top portions of the belts 23 of the conveyor 11 at the input end of the conveyor nearest to the conveyor 15. Each article 43 is delivered by the slide to the conveyor 11 at an angle which insures that the article will drop to a flat position on the conveyor belts.

A microswitch 44 is supported on an inverted U-shaped frame 45 which spans the feed conveyor 11 between the side panels 32 and 33 for counting the articles 43 as they are deposited from the slide to the conveyor. The microswitch has a slender sensor rod 50 which projects downwardly generally along the center line or near the center line of the conveyor 11 between two of the more centrally located conveyor belts 23. The sensor is positioned along the solid-line representation shown in FIG. 1 and is pivoted to the broken line position by each article 43 as the article moves from the slide to the belts of the conveyor 11. The sensor activates the microswitch each time it is contacted by one of the articles to be counted and stacked. The microswitch is connected by a line 51 to suitable counting and control circuitry, not shown, which operates the stacking rack in the desired timed sequence in accordance with the number of articles to be arranged in each stack. The control circuitry is any suitable arrangement of components which senses the number of articles 43 delivered along the conveyor 11 and is adapted to be set to operate the stacking rack 13 each time the desired preset number has been delivered from the feed conveyor to the stacking conveyor.

The stacking conveyor 12 is supported from the side panels 32 and 33 aligned horizontally and in underlapping relationship with the feed conveyor 11. The stacking conveyor is essentially identical in construction to the feed conveyor including a set of five laterally spaced parallel belts 60 which run in spaced grooves on longitudinally spaced end rollers 61 and 62 mounted on lateral shafts 63 and 64, respectively, extending between the side panel assemblies 32 and 33. The stacking conveyor is driven by a belt 65 running between a pulley 70 on end roller 62 and shaft 64, and the pulley 35 on the shaft of the motor 22.

The stacking rack 13 is mounted vertically in a meshing relationship with the belts 60 of the stacking conveyor 12 for movement between the upper stacking position shown in FIG. 1 and a lower release position illustrated in FIG. 4. The stacking rack is a fork-like structure, see FIG. 3, including a plurality of vertical tines or rods 80 arranged in parallel spaced relation in an arcuate configuration mounted at lower ends in an arcuate flange or base member 81 supported on a piston rod 82 of a double acting, fluid actuated piston assembly 83. A horizontal rod 80a is secured at one end to each of the tines 80 about midway between the base member 81 and the upper end of the tine at a location which positions the rods 80a slightly above the top portions of the belts 60 when the rack 13 is at the upper stacking position of FIG. 1. The rods 80a collectively define a platform for stacking the articles 43 in a stack 43S above the stacking conveyor 12. The tines 80 are preferably positioned to define a cylindrical shape having a radius substantially equal to the radius of the articles 43 which are counted and stacked by the unit 10 so that the circular periphery of each of the articles 43 along a segment of the forward edge of each of the articles engages the tines as the stacking rack holds the articles in stacked relationship as in FIG. 2. The spacing of the tines positions one tine and rod 80a between each adjacent pair of the conveyor belts 60 with the outside end tines being disposed outwardly of the two outside belts 60 of the conveyor 12. The tines are equal in length and extend to a height above the conveyor belt 12 determined by the maximum height to which the articles 43 may be stacked by the unit. The tines should extend somewhat above the highest stack desired to be handled. The piston 83 is supported on a bracket 84 mounted on the horizontal lower cross members 21 of the supporting frame of the unit. The piston is supplied with a fluid such as air through the lines 85 and 90 extending to a suitable controlled supply source, not shown, within the supporting framework of the unit. While the piston is represented as being fluid actuated in both vertical directions, it will be understood that suitable pistons are available and may be used which are fluid actuated in one direction and returned by spring action in the other direction. Protective side panels 91 and 92 are secured to the support frame for protecting the conveyor driving belts and other control and power mechanism of the unit.

The take-away conveyor 14 is supported between the side panels 32 and 33 aligned with the stacking conveyor at the discharge end of the stacking conveyor as seen in FIGS. 1 and 2. The take-away conveyor includes a plurality of laterally spaced parallel belts 100 mounted on end rollers 101 and 102 which are supported on shafts 103 and 104 respectively. A pulley 105 on the roller 102 and a shaft 104 is driven by a belt 110 extending to a second motor 22a on a platform 23a for powering the take-away conveyor. A guard panel 92a protects personnel from the motor shaft and belt 110. The feed or input end of the take-away conveyor is closely spaced from the discharge end of the stacking conveyor for receiving each of the stacks 43S and moving the stacks to locations where they may be removed and packaged by operating personnel or automatically packaged by other equipment, not shown, and not comprising a part of the present invention.

In operation the articles to be counted and stacked by the unit 10 are fed to the unit in sequential spaced relation by the conveyor 15 which, as previously indicated, may be a cooling conveyor carrying the articles from an oven in which they are cooked. As each of the articles reaches the discharge end of the conveyor 15, it is dropped to the slide 40 along which it moves to and is dropped on the feed conveyor 11. As each article moves to the feed conveyor it engages the sensor 50 of the microswitch 44. The sensor is deflected to the broken line position of FIG. 1 actuating the microswitch which sends a signal to the control system of the unit advancing the counter in the system one unit and activating such other portions of the control system as required to accomplish the desired counting and operation of the stacking fork 13. Each of the articles 43 is moved along the feed conveyor 11 and discharged at the end of the conveyor at the roller 24 to the stacking rack 13 above the conveyor 12. The speed of the feed conveyor 11 is set at a rate which propels each of the articles 43 from the discharge end of the conveyor in a generally horizontal position to maintain horizontal alignment of the article as it lands on the rods 80a of the stacking rack. At the upper stacking position of the stacking rack the rods 80a are slightly above the belts 60 of the conveyor 12 so that the stack 43S is fully supported by the rack. Each article is dropped downwardly to the stacking rack with the forward or leading edge of the article engaging the tines 80 of the stacking rack and the articles resting on the horizontal rods 80a of the stacking rack as the belts 60 move beneath the article stack between and past the tines. As each subsequent or succeeding article is dropped to the stacking conveyor, it lands on the previous article held by the stacking rack with the stack 43S being arranged on the stacking rack as shown in FIG. 1. The stacking conveyor is adjusted to operate at a speed somewhat less then the speed of the feed conveyor 11. When the desired number of articles 43 are deposited in a stacked relationship on the stacking rack, as sensed by the microswitch, the control system of the unit operates the piston 83 rapidly retracting the piston rod 82 with the stacking rack 13 downwardly to the lower end position shown in FIG. 4. At this lower end position, the rods 80a and the upper ends of the tines 80 are below the top surfaces of the belt portions of the stacking conveyor releasing the stack 43S which is then moved by the belts 60 to the discharge end of the stacking conveyor at the roller 61. The rack is rapidly withdrawn by the cylinder so that the articles forming the stack 43S remain aligned as the rack is retracted below the belts of the stacking conveyor. When the upper ends of the tines move below the stacking belts, the stack is released and moved by the belts to the discharge end of the conveyor 12 where the stack is transferred to the input end of the take-away conveyor 14. The stack is moved on the take-away conveyor to a packaging station, not shown, or, if desired, the stack may be manually lifted from the take-away conveyor toward the discharge end of the conveyor by the unit operator for placing in a package.

The control system of the unit is adjusted to retain the stacking rack 13 at the lower end position of FIG. 4 for a sufficient length of time to allow the stack 43S to fully clear tines so that the stack will not be upset or disarranged upon the upward movement of the stacking rack to start the next stack of articles. The timing is also adjusted so that the stacking rack is returned upwardly in sufficient time after the removal of the previous stack away from the rack to receive the next of the articles 43 from the feed conveyor 11. Thus, it is necessary for the stacking rack to move from the upper stack holding position to the lower stack release position and return to the upper position during the time between the discharge of successive articles 43 from the feed conveyor 11 in order to properly stack all of the articles fed into the unit. The take-away conveyor is adjusted to operate at a somewhat slower speed than the stacking conveyor to facilitate removal of the stacks from the conveyor. It will be apparent that as each stack is released by the downward movement of stacking rack, the counter in the related control mechanism of the control system is reset to start the counting again as the next stack is arranged on the stacking conveyor. Thus, the unit sequentially counts, stacks, and discharges flat articles rapidly and efficiently without the use of plates and other massive, space requiring components.

It will be recognized that the stacking rack may comprise only the vertical tines 80 so that the stack 43S is formed directly on the belts 60 against the tines. An alternate form of stacking rack 13A is illustrated in FIG. 5 wherein the horizontal rods 80a are eliminated leaving only the vertical tines 80 arranged in a semicircular configuration. With this arrangement, however, the belts must slide along the bottom article in the stack and thus the belts will wear more rapidly. Also, such a system is not preferred where the articles 43 are likely to be easily wrinkled or folded by the sliding effect of the belts on the bottom article in the stack.

What is claimed is:

1. Apparatus for counting and stacking a plurality of substantially flat articles comprising: a feed conveyor for sequentially receiving and introducing said articles into said apparatus; a stacking conveyor at the discharge end of said feed conveyor for sequentially receiving said articles from said feed conveyor and arranging said articles in a stacked relationship thereon, said stacking conveyor comprising longitudinally spaced end rollers and a plurality of substantially parallel, laterally spaced belts running on said end rollers; and a stacking fork comprising a plurality of substantially vertical tines arranged in a semicircular configuration and a horizontal rod secured on each of said tines projecting toward said feed conveyor, said rods defining a stack support platform above said stacking conveyor at an upper stacking position, said tines and said rods being disposed in intermeshing relationship with said stacking conveyor belts and vertically movable between said upper article stacking position at which said tines project above said stacking conveyor belts for intercepting said articles and said rods are disposed above said stacking conveyor belts for holding said articles in a stacked relationship above said belts until a predetermined number of said articles are formed in a stack on said horizontal rods, and said stacking fork being movable to a lower position at which said horizontal rods are below said belts and the upper ends of said tines are no higher than said belts for releasing said stack for discharge from said stacking conveyor.

2. Apparatus in accordance with claim 1 including counting means operatively associated with said feed conveyor for counting each of said articles as said article is moved along said feed conveyor.

3. Apparatus in accordance with claim 2 wherein said feed conveyor comprises longitudinally spaced end rollers and a plurality of laterally spaced substantially parallel belts and said counting means includes a sensor member disposed in intermeshing relationship with said belts of said feed conveyor.

4. Apparatus for counting and stacking a plurality of substantially flat articles comprising: input slide means; a feed conveyor positioned substantially horizontally at the discharge end of said input slide means and comprising a plurality of laterally spced, substantially parallel belts running on longitudinally spaced end rollers; a counting switch supported over said feed conveyor and having a sensor positioned to be engaged by each article supplied to and moved along said feed conveyor; a stacking conveyor positioned horizontally at the discharge end of said feed conveyor, said stacking conveyor having a plurality of laterally spaced, substantially parallel belts running on longitudinally spaced end rollers; a stacking fork positioned in intermeshing relationship with said belts of said stacking conveyor spaced from the discharge end of said feed conveyor and having substantially vertical tines and horizontal support rods movable between an upper stacking position at which said tines and said rods project above said belts of said stacking conveyor and a lower stack release position at which said tines and rods are lower than the top article supporting portions of said belts of said stacking conveyor, said tines being arranged along a substantially circular arc for engaging and holding circular flat articles; and a take-away conveyor horizontally positioned at the discharge end of said stacking conveyor for sequentially receiving stacks of articles of predeteremined number arranged by said stacking fork on said stacking conveyor.

5. Apparatus in accordance with claim 4 wherein said stacking fork is supported from and operated by a substantially vertical cylinder assembly adapted to retract and extend for raising and lowering said stacking fork between stacking end discharge positions.

6. Apparatus in accordance with claim 5 wherein said feed conveyor operates at a higher rate than said stacking conveyor and said stacking conveyor operates at a higher rate than said take-away conveyor.

* * * * *